United States Patent
Kimura

(10) Patent No.: US 7,778,468 B2
(45) Date of Patent: Aug. 17, 2010

(54) DECODING APPARATUS, DEQUANTIZING METHOD, AND PROGRAM THEREOF

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1390 days.

(21) Appl. No.: 11/172,967

(22) Filed: Jul. 5, 2005

(65) Prior Publication Data

US 2006/0215917 A1    Sep. 28, 2006

(30) Foreign Application Priority Data

Mar. 23, 2005    (JP) .............................. 2005-084084

(51) Int. Cl.
*G06K 9/00*    (2006.01)
(52) U.S. Cl. .................. 382/223; 382/168; 382/251
(58) Field of Classification Search ................. 382/223, 382/251, 168
See application file for complete search history.

(56) References Cited

U.S. PATENT DOCUMENTS

| | | |
|---|---|---|
| 5,495,538 A | 2/1996 | Fan |
| 5,608,654 A | 3/1997 | Matsunoshita |
| 5,615,288 A | 3/1997 | Koshi et al. |
| 5,768,425 A | 6/1998 | Praveen et al. |
| 5,778,102 A | 7/1998 | Sandford et al. |
| 5,787,204 A | 7/1998 | Fukuda |
| 5,822,463 A | 10/1998 | Yokose et al. |
| 5,828,789 A | 10/1998 | Yokose et al. |
| 6,072,909 A | 6/2000 | Yokose et al. |
| 6,157,741 A | 12/2000 | Abe et al. |
| 6,205,254 B1 | 3/2001 | Koshi et al. |
| 6,301,368 B1 | 10/2001 | Bolle et al. |
| 6,510,252 B1 | 1/2003 | Kishimoto |
| 6,522,822 B2 | 4/2003 | Kishimoto |
| 6,748,133 B2 | 6/2004 | Kondo et al. |
| 6,996,282 B1 | 2/2006 | Kondo et al. |
| 7,200,277 B2 | 4/2007 | Joshi et al. |
| 2002/0009209 A1 | 1/2002 | Inoue et al. |
| 2002/0081035 A1 | 6/2002 | Bright et al. |
| 2002/0085679 A1 | 7/2002 | Zastrow et al. |
| 2003/0007693 A1 | 1/2003 | Yokose et al. |
| 2003/0215111 A1 | 11/2003 | Zhang et al. |

(Continued)

FOREIGN PATENT DOCUMENTS

CN    1286575 A    3/2001

(Continued)

OTHER PUBLICATIONS

Taubman et al., "JPEG 2000- Image Compression Fundamentals, Standards, and Practice," 2002, Kluwer Academic Publisher, pp. 14, 97-99 and 481-484.*

(Continued)

*Primary Examiner*—Samir A. Ahmed
*Assistant Examiner*—John W Lee
(74) *Attorney, Agent, or Firm*—Oliff & Berridge, PLC

(57) ABSTRACT

A decoding apparatus includes a distribution generating section and a correcting section. The distribution generating section generates a frequency distribution of quantization index values. The correcting section corrects dequantization values corresponding to the quantization index values based on the frequency distribution of quantization index values generated by the distribution generating section.

7 Claims, 12 Drawing Sheets

U.S. PATENT DOCUMENTS

| | | |
|---|---|---|
| 2005/0271284 A1 | 12/2005 | Chen et al. |
| 2006/0045361 A1 | 3/2006 | Yokose |
| 2006/0133686 A1 | 6/2006 | Gomila et al. |
| 2006/0215918 A1 | 9/2006 | Kimura |

FOREIGN PATENT DOCUMENTS

| | | |
|---|---|---|
| JP | A 5-14735 | 1/1993 |
| JP | A 5-316361 | 11/1993 |
| JP | A-06-054293 | 2/1994 |
| JP | A 7-336684 | 12/1995 |
| JP | A-2004-080741 | 3/2004 |

OTHER PUBLICATIONS

Kegl et al., "Learning and Design of Principal Curves," 2000, IEEE, vol. 22, pp. 281-297.*

Kotani et al., "Face Recognition using Vector Quantization Histogram method," 2002, IEEE, vol. 2, pp. 105-108.*

Kégl et al., "Learning and Design of Principal Curves," IEEE Transactions on Pattern Analysis and Machine Intelligence, vol. 22, No. 3, 2000, pp. 281-297.

Taubman et al., "JPEG2000—Image Compression Fundamentals, Standards and Practice," Kluwer Academic Publishers, 2002, pp. 14, 97-99 and 481-484.

"Information Technology-Digital Compression and Coding of Continuous-tone Still Images-Requirements and Guidelines," CCITT, Recommendation T.81, 182 pages, Sep. 1992.

Gersho et al., "Vector Quantization and Signal Compression," pp. 177-178, 2001.

"Information Technology-JPEG 2000 Image Coding System: Core Coding System," ITU-T, Recommendation T.800, 195 pages, Aug. 2002.

Heeger et al., "Pyramid-Based Texture Analysis/Synthesis," Siggraph, pp. 229-238, 1995.

U.S. Appl. No. 11/151,212, filed Jun. 14, 2005, Kimura.

U.S. Appl. No. 11/153,395, filed Jun. 16, 2005, Kimura.

U.S. Appl. No. 11/168,920, filed Jun. 29, 2005, Kimura.

U.S. Appl. No. 11/500,946, filed Aug. 9, 2006, Kimura.

Dec. 14, 2009 Office Action issued in U.S. Appl. No. 11/179,988.

Taubman et al., "JPEG 2000: Image Compression Fundamentals, Standards and Practice," 2002, Kluwer Academic Publisher, p. 14 and 99-100.

* cited by examiner

ENCODING PROCESS

DECODING PROCESS

QUANTIZATION IN JPEG

QUANTIZATION IN JPEG 2000

QUANTIZATION INTERVAL

DECODING APPARATUS

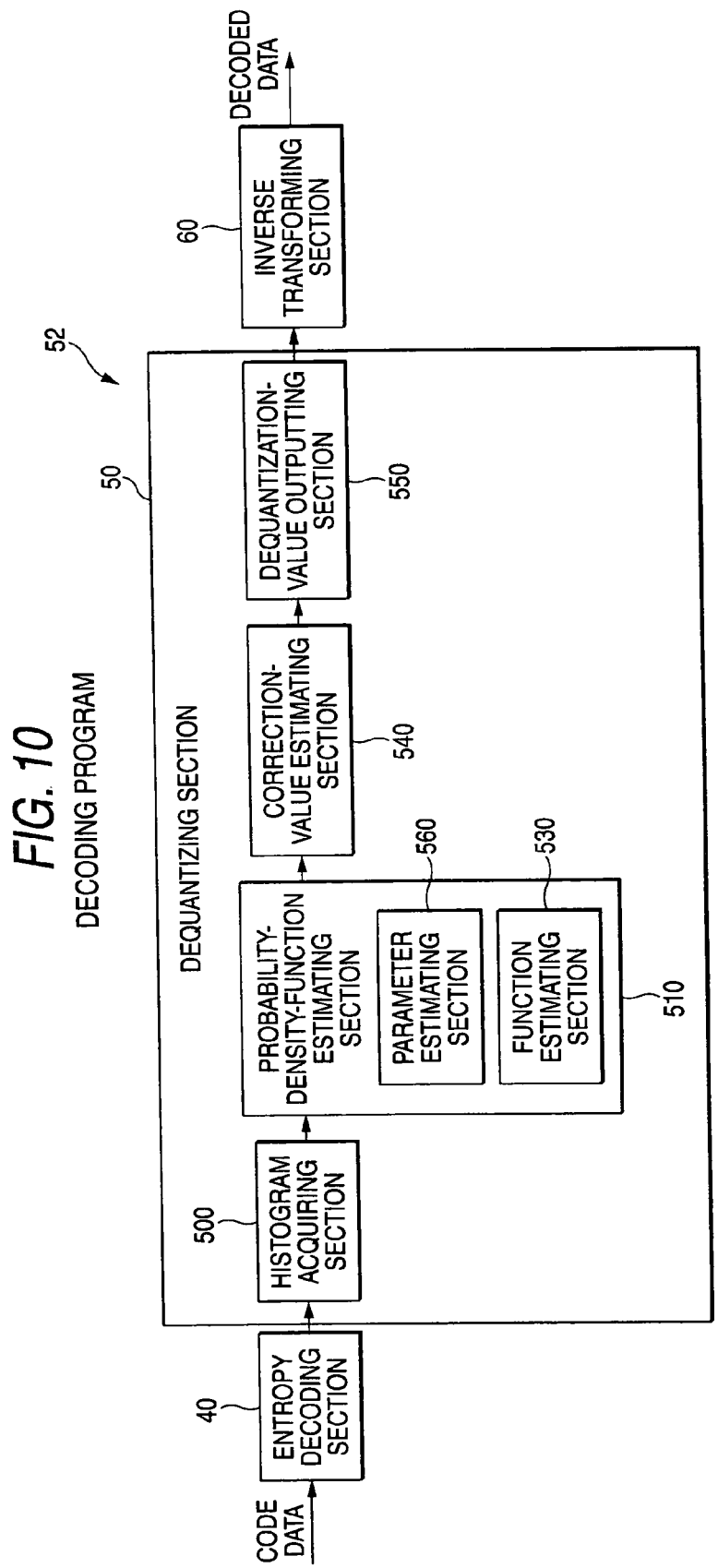

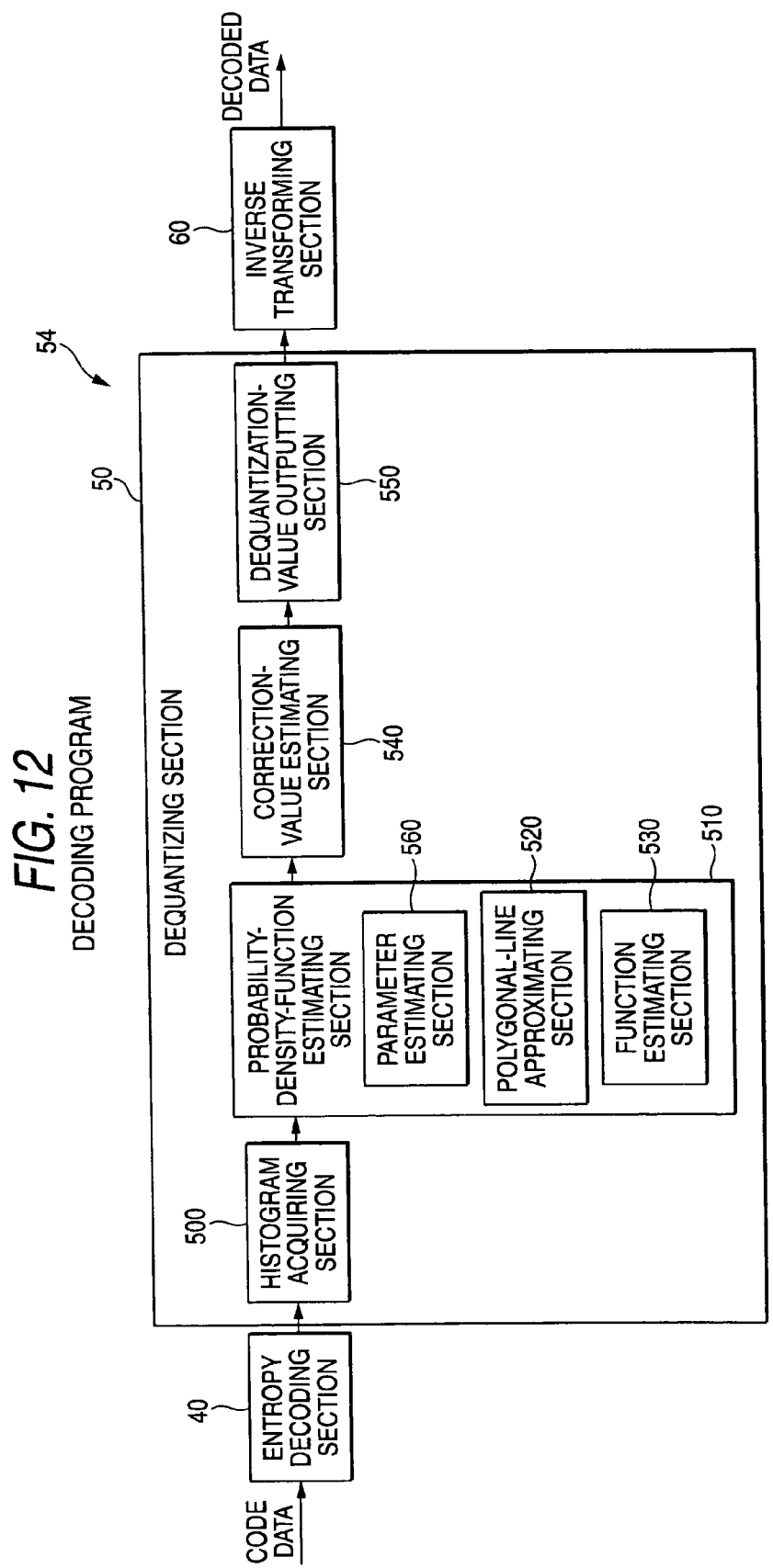

DECODING APPARATUS, DEQUANTIZING METHOD, AND PROGRAM THEREOF

BACKGROUND OF THE INVENTION

1. Field of the Invention

The invention relates to a decoding apparatus for decoding code data generated by an encoding process. More specifically, the invention relates to a decoding apparatus for dequantize code data generated by an encoding process including quantizing data, to decode the code data.

2. Description of the Related Art

For example, JP Hei. 5-14735A discloses a method applying a low pass filter to only a boundary between DCT (discrete cosine transform) blocks.

Further, JP Hei. 5-316361 A discloses a method, which determines as to whether or not edges are present in an image and selects, based on a determination result, a filter to be applied.

Furthermore, JP Hei. 7-336684 A discloses a method, which adds noise to DCT coefficients when it is determined that distortion is noticeable in a region.

In addition, ITU-T Recommendation T.81 discloses a JPEG standard.

Moreover, ITU-T Recommendation T.800 discloses a JPEG2000 standard.

Further, "Pyramid based texture analysis/synthesis" (D. Heeger and J. Bergen, Computer Graphics, pp. 229-238, SIGGRAPH 95, 1995) discloses a method, which generates an image having similar textures by adjusting frequency distribution of transform coefficients.

SUMMARY OF THE INVENTION

The invention provides a decoding apparatus for decoding code data more efficiently.

According to one embodiment of the invention, a decoding apparatus includes a distribution generating section and a correcting section. The distribution generating section generates a frequency distribution of quantization index values. The correcting section corrects dequantization values corresponding to the quantization index values based on the frequency distribution of quantization index values generated by the distribution generating section.

or

BRIEF DESCRIPTION OF THE DRAWINGS

Embodiments of the invention will be described in detail based on the following figures, wherein:

FIG. 10 is a diagram illustrating configuration of a second decoding program 52;

FIG. 12 is a diagram illustrating a configuration of a third decoding program 54.

DETAILED DESCRIPTION OF THE EMBODIMENTS

To begin with, for the purpose of facilitating understanding of embodiments of the invention, the background and outline of the invention will be described.

Since images, audios or the like have enormous amount of data, it is common to reduce an amount of the data by compressing it and then store or transmit the compressed data. For example, an amount of multi-value image data generated when color documents or photographs are transformed into an electronic form by a scanner or when scenery is photographed by a digital camera can be significantly reduced by compressing the data using a lossy coding process such as JPEG, JPEG200 or the like.

However, the lossy coding process causes coding distortion; this is a problem. In particular, the JPEG process has a problem in that block distortion occurs at DCT block boundaries of decoded images (coding distortion).

In this connection, a generation mechanism for the coding distortion of the lossy coding process will be first described.

Figure 1A:
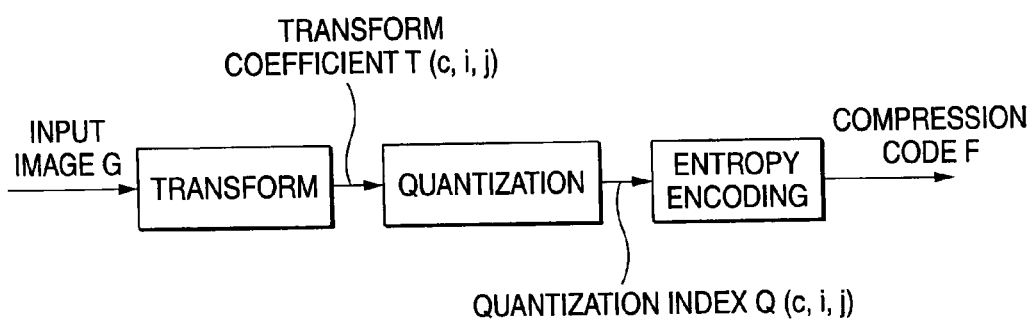
FIG. 1A is a block diagram schematically illustrating an encoding process of a transform coding method such as JPEG and JPEG2000.
Figure 1B:
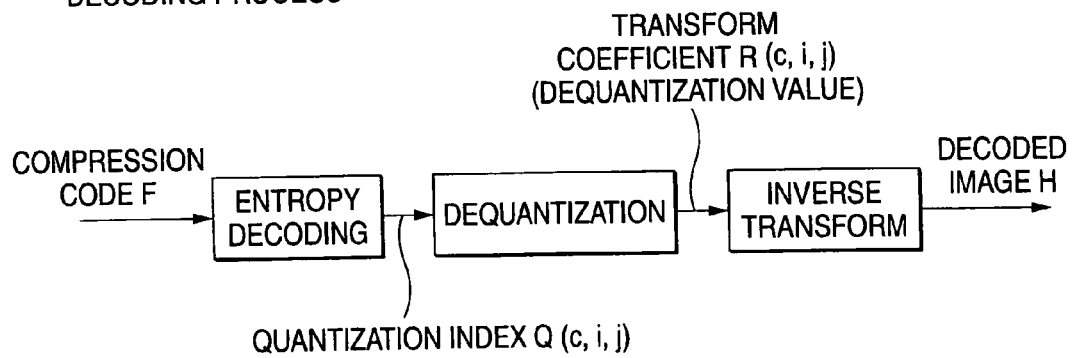
FIG. 1B is a block diagram schematically illustrating a decoding process of a transform coding method such as JPEG and JPEG2000.

FIGS. 1A and 1B are block diagrams schematically illustrating a transform coding method such as JPEG and JPEG2000, where FIG. 1A shows an outline of an encoding process and FIG. 1B shows an outline of a decoding process.

Figure 2A:
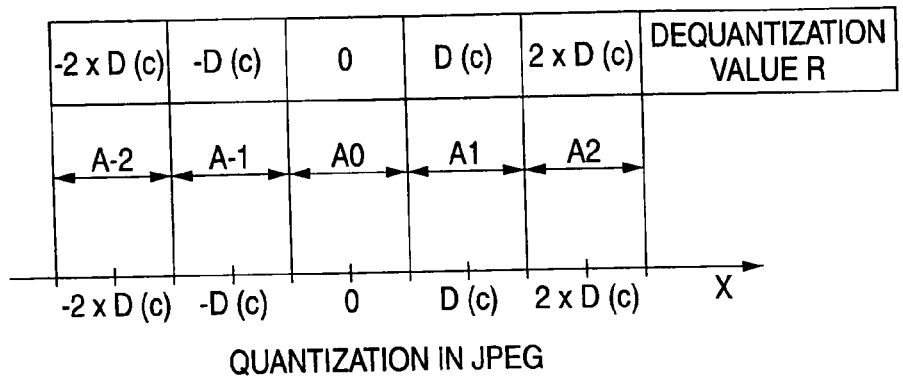
FIG. 2A is a diagram illustrating a quantization process in the transform coding method.
Figure 2B:
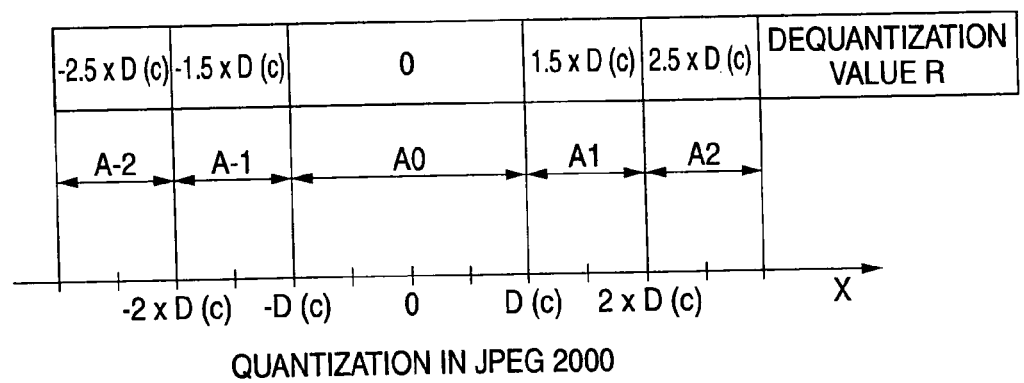
FIG. 2B is a diagram illustrating a quantization process in the transform coding method.
Figure 2C:
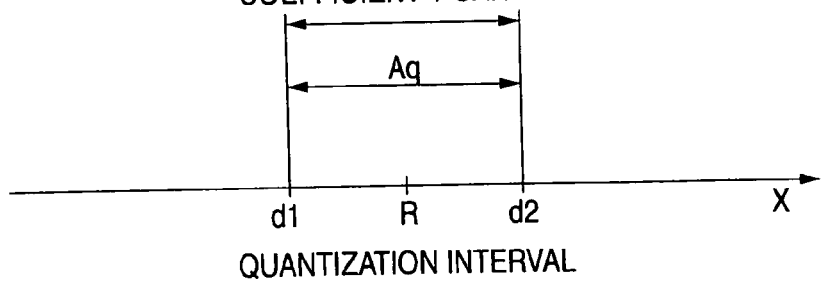
FIG. 2C is a diagram illustrating a quantization process in the transform coding method.

FIGS. 2A to 2C are diagrams illustrating a quantization process in the transform coding method. A transform coefficient $T(c, i, j)$ and a quantization index $Q(c, i, j)$ shown in FIGS. 1A and 1B are functions of variables c, i and j. The variable c is an index indicating a kind of transform coefficient. For example, in the case of the DCT transform using 8×8 blocks, the variable c is a value (an integer in a range of 1 to 64) indicating one of 64 (8×8) transform coefficients. In a case of the wavelet transform, the variable c is a value indicating one of components such as 1HH, 1LH, 1HL, 2HH, 2LH, 2HL, ..., NLL. In addition, the transform variables i and j are variables indicating positions of the transform coefficients, respectively. For example, in the case of the DCT transform, a c-th transform coefficient in a block located at an i-th row from the top and a j-th column from the left is indicated as T (c, i, j). In the case of the wavelet transform, data of a c-th transform coefficient located at an i-th row from the top and a j-th column from the left is indicated as T (c, i, As shown in FIG. 1A, in an encoding process of the transform coding method, an input image G is subject to a transform process such as the discrete cosine transform (DCT) or the wavelet transform to generate a transform coefficient T of the input image G. The transform coefficient T is then quantized into a quantization index Q. The quantization index Q is subject to an entropy coding process (lossless coding process) to be a compression code F.

Here, the quantization index refers to information used to distinguish quantization values. In addition, the quantization value refers to a value to which a group of numerical values within a specific range (quantization interval) are degenerated. For example, as shown in FIGS. 2A to 2C, the quantization values are discrete values (−2×D(c) to 2×D(c) in this example) representing quantization intervals (A−2~A2), respectively.

Code data (the compression code F) generated in this way are entropy-decoded into a quantization index Q, as shown in FIG. 1B. This quantization index Q is equivalent to the quantization index Q in the encoding process.

Then, the quantization index Q is dequantized into a transform coefficient R (i.e., a dequantization value). Thereafter, the transform coefficient R is inversely transformed to generate a decoded image H.

Here, the dequantization value refers to a value, which is generated based on the quantization index or the quantization value and is used for decoding of data. For example, the dequantization value is a transform coefficient of the JPEG or JPEG2000 (transform coefficient being associated with a quantization index).

In the above-described process, coding distortion occurs during the quantization. In general, precision of the transform coefficient T of an original image is higher than that of the quantization index Q. Accordingly, the transform coefficient R reproduced by using the quantization index Q may be different from the original transform coefficient T. This is the cause of the coding distortion.

Next, the quantization and the dequantization will be described in detail with reference to FIGS. 2A to 2C.

The quantization is performed using a quantization step width D(c) prepared for each transform coefficient c. The quantization step width D(c) is a function of the kind of transform coefficient c. For example, in the case of JPEG, the quantization index Q is calculated according to the following equation in the quantization.

$Q(c,i,j)=\text{round}(T(c,i,j)/D(c))$

Where "round( )" is a function outputting an integer closest to an input value.

In addition, the dequantization value R is calculated according to the following equations (Equation (1)) in the dequantization.

$R(c,i,j)=Q(c,i,j) \times D(c)$

In the case of JPEG2000, the quantization index Q and the dequantization value R are calculated according to the following equations (1).

$Q(c,i,j)=\text{sign}(T(c,i,j)) \times \text{floor}(|T(c,i,j)|/D(c))$ $R(c,i,j)=(Q(c,i,j)+r) \times D(c), \text{ if } Q(c,i,j)>0$ $R(c,i,j)=(Q(c,i,j)-r) \times D(c), \text{ if } Q(c,i,j)<0$ $R(c,i,j)=0, \text{ if } Q(c,i,j)=0$ \hfill (1)

Where, "sign( )" is a function outputting positive sign or negative sign, "floor( )" is a function nulling decimal places, and "| |" is a symbol representing an absolute value.

In addition, "r" is a numerical value in a range of 0 to 1, typically r=0.5. In the JPEG2000, there may be a case where lower bits are not encoded. Here, a case where all bits including the least significant bit are encoded will be described by way of examples. Alternatively, in the JPEG2000, it is possible to obtain number of bits, which are not encoded in the encoding, from a code stream in the decoding. Accordingly, by shifting the quantization step width D to the left by the number of bits and setting the shifted quantization step width as a new quantization width, the JPEG2000 may have the same operation as the JPEG.

In the JPEG2000, when the correction value r shown in Equation (1) is appropriately set, it is possible to obtain decoded images with less distortion. In this manner, in the JPEG2000, quality of decoded images can be improved by setting the dequantization values to values other than a central value within the range of dequantization.

Similarly, in the JPEG, quality of decoded images can be improved by introducing the same correction value r as the JPEG2000. Specifically, the dequantization values are calculated using a following equation (Equation 2).

$R(c,i,j)=(Q(c,i,j)+r-0.5) \times D(c),$ when $Q(c, i, j)>0$ $R(c,i,j)=(Q(c,i,j)-r+0.5) \times D(c),$ when $Q(c, i, j)<0$ $R(c,i,j)=0, \text{ when } Q(c,i,j)=0$ \hfill (2)

In this manner, it is possible to perform the decoding process with higher reproducibility by calculating the dequantization values using the appropriate correction value r.

Next, a method of calculating the appropriate correction value r will be described.

FIGS. 2A to 2C are diagrams illustrating the quantization and dequantization in the transform coding process.

As shown in FIGS. 2A to 2C, transform coefficients T (original data) are distributed on an X axis, which is a numerical straight line. In the JPEG, the X axis is divided into regions A0, A1, ..., A−1, A−2, ... (quantization intervals), as shown in FIG. 2A.

If a transform coefficient T exists in a quantization interval A0, the quantization index Q corresponding to this transform coefficient T becomes 0. Similarly, if a transform coefficient T exists in a quantization interval Aq, the quantization index Q corresponding to this transform coefficient T becomes q.

Further, in the JPEG2000, as shown in FIG. 2B, if a transform coefficient T exists in a quantization interval Aq, the quantization index Q corresponding to this transform coefficient T becomes q.

Also, when the dequantization index is dequantized, the dequantization values shown in FIG. 2B are taken.

Here, for the sake of simplicity, only the quantization interval Aq within which the quantization index Q becomes q will be considered. It is assumed that the transform coefficients T exist in the quantization interval Aq.

In this case, as shown in FIG. 2C, the dequantization interval Aq has a range of $d1 \leq x < d2$. At this time, $d1 \leq T < d2$.

Here, let consider a probability density function fT(x) representing probability of appearance of the transform coefficients T in the quantization interval Aq. The probability density function fT(x), which is defined in the range of $d1 \leq x < d2$, represents probability of the value x.

In addition, the probability density function fT(x) is defined to have an integral value of 1 when integrated in the entire range of $d1 \leq x < d2$ of the quantization interval.

When such a probability density function fT(x) exists, a dequantization value to minimize a square error between the transform coefficient T before quantization (original data) and the dequantization value R is a dequantization value R calculated using the following equation (Equation 3), according to "Vector Quantization and Signal Compression, Kluwer Academic Publishers, pages 177-178".

$$R = \int_{d1}^{d2} x fT(x) dx \quad (3)$$

When the value R calculated by the Equation (3) is substituted into the Equation (1) or (2), the correction value r to minimize the square error can be determined.

That is, it is necessary to estimate the probability density function of original transform coefficients T.

Then, the decoding apparatus 2 according to this embodiment estimates the probability density of transform coefficient T(c, i, j) based on the quantization index Q(c, i, j), and determines the correction value r based on the estimated probability density.

FIGS. 3A to 3D are diagrams illustrating the frequency distribution of transform coefficients T.

Figure 3A:
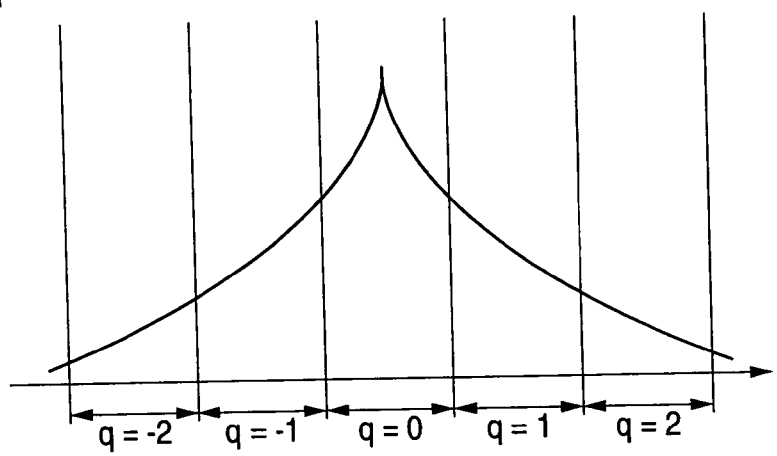
FIG. 3A is a diagram illustrating distribution of transform coefficients.
Figure 3B:
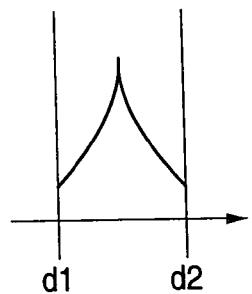
FIG. 3B is a diagram illustrating distribution of transform coefficients.
Figure 3C:
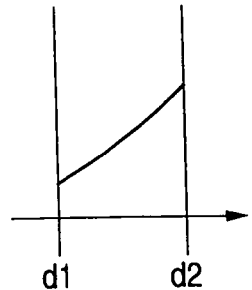
FIG. 3C is a diagram illustrating distribution of transform coefficients.
Figure 3D:
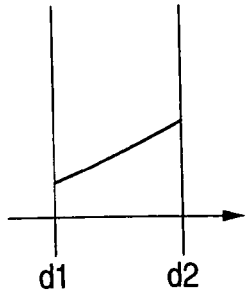
FIG. 3D is a diagram illustrating distribution of transform coefficients.

In general, it is considered that DCT coefficients or wavelet transform coefficients show a Laplace distribution or a generalized Gaussian distribution, as shown in FIG. 3A. When probability variables showing such a distribution are dequantized, a dequantization range is divided as shown in FIG. 3A. In this case, the probability density within each quantization range has a form as shown in FIGS. 3B, 3C and 3D.

The decoding apparatus 2 prepares the frequency distribution (for example, a histogram) of the quantization index Q(c, i, j) and estimates the distribution of transform coefficients T using the prepared histogram.

Embodiment

Hereinafter, an exemplary embodiment of the invention will be described.

In this embodiment, decoding of code data encoded according to the JPEG2000 will be described by way of examples. Further, a decoding process described in this embodiment is similar, in its general configuration, to that described in ITU-T Recommendation T.800, but is different from in that the decoding process of this embodiment employs the dequantization process according to embodiments of the invention.

First, a hardware configuration of the decoding apparatus 2 according to this embodiment will be described.

Figure 4:
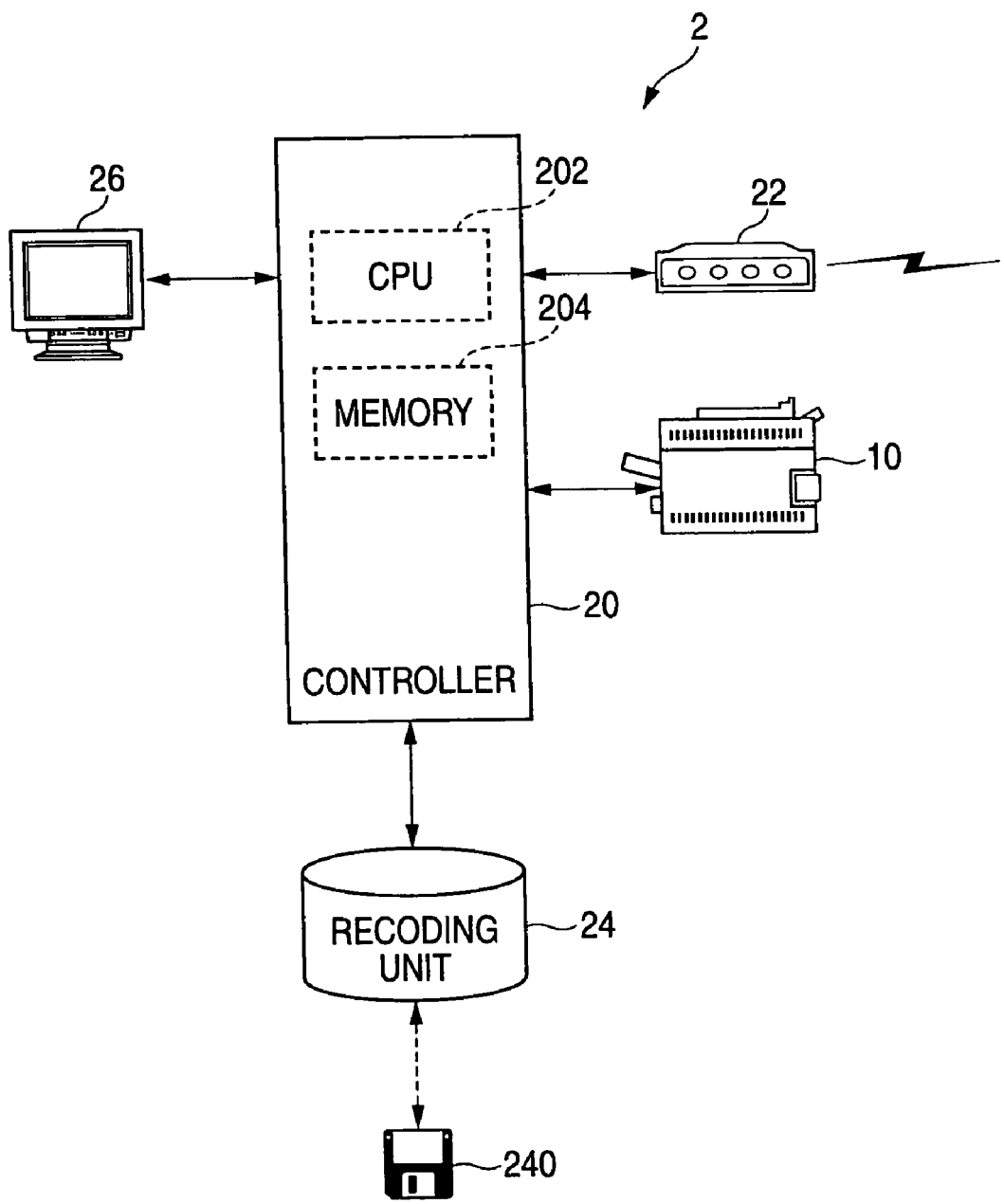
FIG. 4 is a diagram illustrating a hardware configuration of a decoding apparatus 2 to which a decoding method according to embodiments of the invention is applied, with providing a controller 20 centrally.

FIG. 4 is a diagram illustrating a hardware configuration of the decoding apparatus 2 to which a decoding method according to the invention is applied, with a controller 20 as the central figure.

As shown in FIG. 4, the decoding apparatus 2 includes a controller 20 including CPU 202, a memory 204 and the like, a communication unit 22, a storage unit 24 such as HDD, CD and the like, and a user interface unit (UI unit) 26 including an LCD display device or a CRT display device, a key board, a touch panel and the like.

The decoding apparatus 2 is a general-purpose computer in which a decoding program 5, which will be described later, is installed. The decoding apparatus 2 acquires code data through the communication unit 22, the storage unit 24 or the like and decodes the acquired code data.

Figure 5:
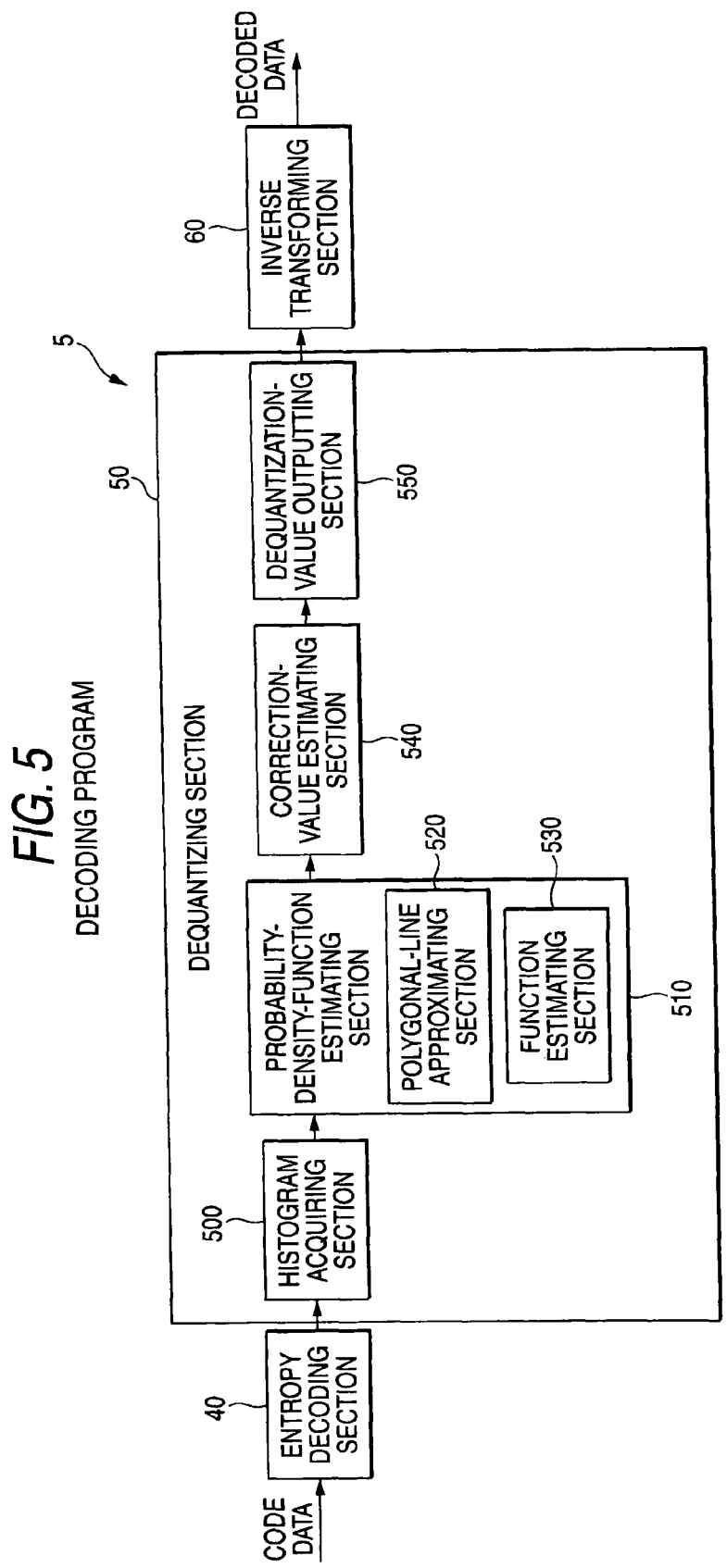
FIG. 5 is a diagram illustrating a functional configuration of a decoding program 5, which is executed by the controller 20 shown in FIG. 4 and implements a dequantizing method according to the embodiment of the invention.

FIG. 5 is a diagram illustrating a functional configuration of a decoding program 5, which is executed by the controller 20 shown in FIG. 4 and implements a dequantizing method according to this embodiment of the invention.

As shown in FIG. 5, the decoding program 5 includes an entropy coding section 40, a dequantizing section 50, and an inverse transforming section 60.

Also, the dequantizing section 50 includes a histogram acquiring section 500, a probability-density-function estimating section 510, a correction-value estimating section 540 and a dequantization-value outputting section 550. The probability-density-function estimating section 510 includes a polygonal-line approximating section 520 and a function estimating section 530.

In the decoding program 5, the entropy decoding section 40 entropy-decodes input code data and outputs the decoded data to the dequantizing section 50.

The entropy decoding section 40 of this embodiment decodes the input code data to generate a quantization index Q and outputs the generated quantization index Q to the dequantizing section 50.

The dequantizing section 50 generates a dequantization value R based on the quantization index Q input from the entropy decoder 40 and outputs the generated dequantization-value R to the inverse transforming section 60.

The inverse transforming section 60 performs an inverse transform based on the dequantization value R input from the dequantizing section 50 to generate a decoded image.

In the dequantizing section 50, the histogram acquiring section 500 acquires a histogram h(q) for quantization index values q based on the quantization indexes Q(c, i, j) input from the entropy decoding section 40.

More specifically, the histogram acquiring section 500 measures the number of the inputted quantization indexes Q(c, i, j), which become the quantization index values q, for all combinations of c, i, and j, and sets the number of quantization indexes Q, which become a quantization matrix value of q, as h(q).

The polygonal-line approximating section 520 performs a polygonal-line approximation for the histogram (frequency distribution) acquired by the histogram acquiring section 500 to prepare a polygonal-line function. That is, the polygonal-line approximating section 520 approximates the probability density function of transform coefficients T using the histogram acquired by the histogram acquiring section 500. In the following description, not the probability density function of transform coefficients T themselves but a probability density function of T(c, i, j)/D(c), which is a value derived from a normalization of the transform coefficients T by the quantization step width D(c), will be considered.

Further, for example, when $f(x) = h(q)$ (where, $x \geq 1$ and $q \leq x < q+1$, or $x \leq -1$ and $q-1 < x \leq q$), and $f(x) = h(0)$ (where, $-1 < x < 1$), the polygonal-line approximating section 520 may approximate the probability density function of T(c, i, j)/D(c) to f(x)/∫f(x). However, such an approximation results in a stepped discrete probability density function, so that it is considered to be different from an actual probability density of transform coefficients T. Accordingly, the polygonal-line approximating section 520 in this example estimates a continuous probability density function, which is considered to be more appropriate.

The polygonal-line approximating section 520 in this example extracts histogram values h(q−1), h(q), and h(q+1) corresponding to three successive quantization index values q, respectively, from the histogram h(q), and prepares the polygonal-line function using the extracted histogram values h(q−1), h(q), and h(q+1).

More specifically, the polygonal-line approximating section 520 extracts the histogram values h(q−1), h(q), and h(q+1) adjacent to each q satisfying a condition of |q|>0.

Here, a range of x=T(c, i, j)/D(c) to generate the quantization index values of q (i.e., a quantization range of quantization indexes q) is set as follows:

$$M1(q) \leq x < M2(q), \text{ when } q>0$$

$$M1(q) < x < M2(q), \text{ when } q<0$$

And, a middle point between $M1(q)$ and $M2(q)$ is set as $M(q)$

In addition, in the JPEG2000, $$M(q)=0, M1(q)=-1, \text{ and } M2(q)=1, \text{ when } q=0$$

$$M(q)=1.5 \times q, M1(q)=q, \text{ and } M2(q)=q+1,$$

when q>0

$$M(q)=1.5 \times q, M1(q)=q-1, \text{ and } M2(q)=q,$$

when q<0

The polygonal-line approximating section 520 performs a polygonal-line approximation for the probability density function indicated by the histogram in a range of $M1(q)$ to $M2(q)$.

Specifically, let consider a segment A connecting a coordinate (M(q−1), h(q−1)) and a coordinate (M(q), h(q)) and a segment B connecting a coordinate (M(q+1), h(q+1)) and the coordinate (M(q), h(q)). The polygonal-line approximating section 520 performs a polygonal-line approximation for the range of $M1(q)$ to $M2(q)$ by using a function corresponding to these segments A and B. This polygonal-line approximation function is defined as Fq(x).

Figure 6:
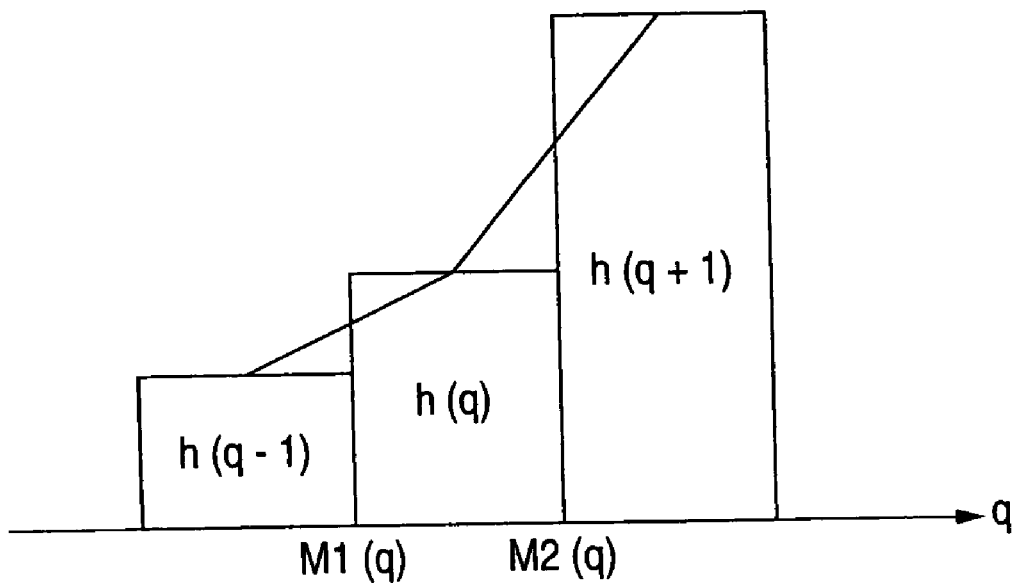
FIG. 6 is a diagram illustrating a polygonal-line approximation.

According to such an approximation, for example, when there are histogram values h(q−1), h(q) and h(q+1), as shown in FIG. 6, a probability density is estimated using the segments connecting the histogram values.

The function estimating section 530 generates a partial probability density function fq(x) corresponding to the quantization index values q based on the polygonal-line function prepared by the polygonal-line approximating section 520.

More specifically, the function estimating section 530 transforms the polygonal-line approximation function Fq(x) generated by the polygonal-line approximating section 520 into the partial probability density function fq(x).

Here, the partial probability density function fq(x) for the quantization index values q is defined as follows:

The probability density function Fq(x) defined by the segment A and the segment B is defined in the range of $M1(q)$ to $M2(q)$. Here, when the range of $M1(q)$ to $M2(q)$ can be transformed into a range of 0 to 1, it is possible to make the range of 0 to 1 correspond to the value r in the above Equation (1) or (2). Such a transform of the range of $M1(q)$ to $M2(q)$ into the range of 0 to 1 gives the partial probability density function fq(x). In addition, due to correspondence to Equation (1) or (2), a correspondence when a value q is a positive value is opposite to that when the value q is a negative value. That is, the partial probability density function fq(x) is defined as follows:

When q>0, a correspondence is taken as M1→0 and M2→1.

$$fq(x)=Fq\{(M2(q)-M1(q))x+M1(q)\}.$$

When q<0, a correspondence is taken as M1→1 and M2→0.

$$fq(x)=Fq\{(M1(q)-M2(q))x+M2(q)\}.$$

The function estimating section 530 obtains the partial probability density function fq(x) according to the above transform equations.

The correction-value estimating section 540 calculates the correction value r corresponding to each quantization index (each quantization interval) using the partial probability density function fq(x) generated by the function estimating section 530.

The correction-value estimating section 540 in this example performs a calculation according to a following equation (Equation 4) to calculate the correction value r.

$$r = \frac{\int_0^1 x \left( \sum_q fq(x) \right) dx}{\int_0^1 \left( \sum_q fq(x) \right) dx} \quad (4)$$

That is, the correction-value estimating section 540 calculates an expected value of x using the probability density function obtained by summing all of the partial probability density functions fq(x) in the range for x of 0 to 1 and normalizing the summation, and sets the calculated expected value as the correction value r.

The dequantization-value outputting section 550 calculates dequantization values to be applied using the correction value r calculated by the correction-value estimating section 540, and outputs the calculated dequantization values to the inverse transforming section 60. The dequantization-value outputting section 550 in this example substitutes the correction value r into the Equation (1) or (2) to calculate the dequantization values to be applied.

As described above, the decoding apparatus 2 in this embodiment generates the partial probability density function fq(x) by performing a polygonal-line approximation for the histogram of the quantization indexes, and calculates the correction value r using the generated partial probability density function fq(x).

[First Modification]

In the above embodiment, the probability density function of transform coefficients is estimated by directly connecting the histogram values. Such estimation has an advantage of simplicity and easiness, but also has following problems.

First, it is assumed that a good estimation system meets that an area of a probability density estimation function approximated with the histogram values taken in a stepped form within each quantization range is equal to an area of a probability density function after estimation within each quantization range.

Figure 7A:
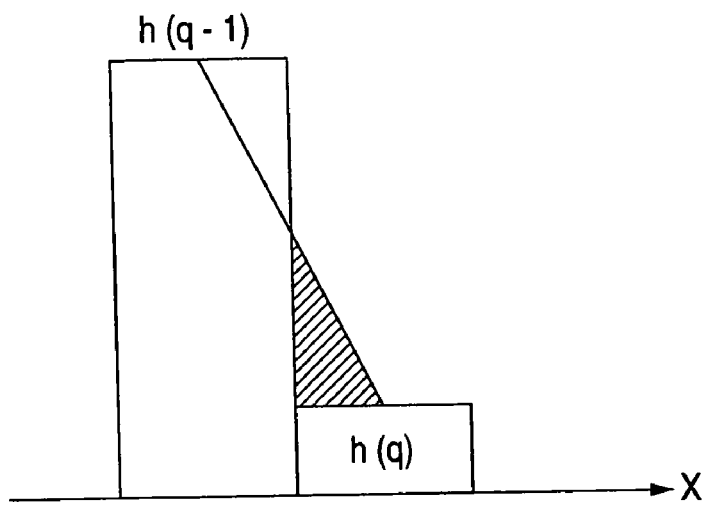
FIG. 7A is a diagram illustrating an area difference between the polygonal-line approximation and a histogram.

Improvements to be accomplished are as follows:

(1) In the polygonal-line approximation in the above embodiment, since an area of a shaded portion shown in FIG. 7A is added, an area of the probability density function approximation becomes larger than the original stepped form.

To avoid this, a value of Fq(x) when x=M(q) may be smaller than h(q). However, a correction has limitations if a difference between adjacent histogram values h(q−1) and h(q) is large and a value of h(q) is small.

Figure 7B:
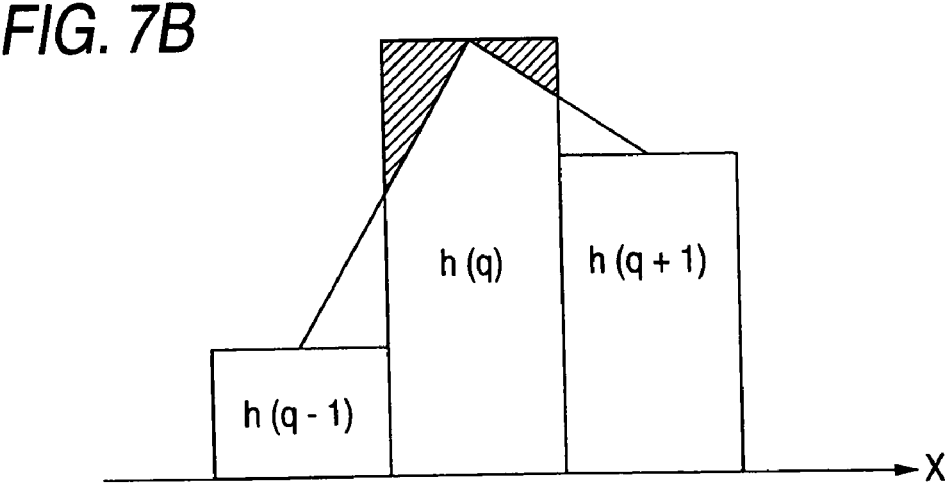
FIG. 7B is a diagram illustrating an area difference between the polygonal-line approximation and a histogram.

(2) In the case where adjacent histogram values h(q−1), h(q) and h(q+1) do not increase or decrease monotonously, since an area of a shaded portion shown in FIG. 7B is subtracted, an area of the probability density function approximation becomes smaller than the original stepped form. To the contrary, when the histogram values h(q−1), h(q) and h(q+1) have a valley shape, the area of the probability density function approximation becomes larger.

For this reason, in the first modification, to overcome this problem, a different polygonal-line approximation is performed as follows, although it is somewhat more complicate than that in the above embodiment.

Configuration of the decoding program 5 in this modification is substantially similar to that in the above embodiment (FIG. 5), but is different in operation of the polygonal-line approximating section 520.

Hereinafter, the operation of the polygonal-line approximating section 520 will be described.

In this modification, the polygonal-line approximating section 520 performs following two operations.

(First operation) Estimation values Fq(M1($q$)) and Fq(M2($q$)) in boundaries M1($q$) and M2($q$) of the quantization range are made to be correctable values. Here, a correction in this modification means correcting an area of a stepped probability density function becomes substantially to be as equal to an area of a probability density function after estimation, within the quantization as possible.

(Second operation) An estimation value Fq(x) at any point x within the quantization range is defined so as to be as less changed as possible.

Hereinafter, the polygonal-line approximation will be described in more detail.

Figure 8A:
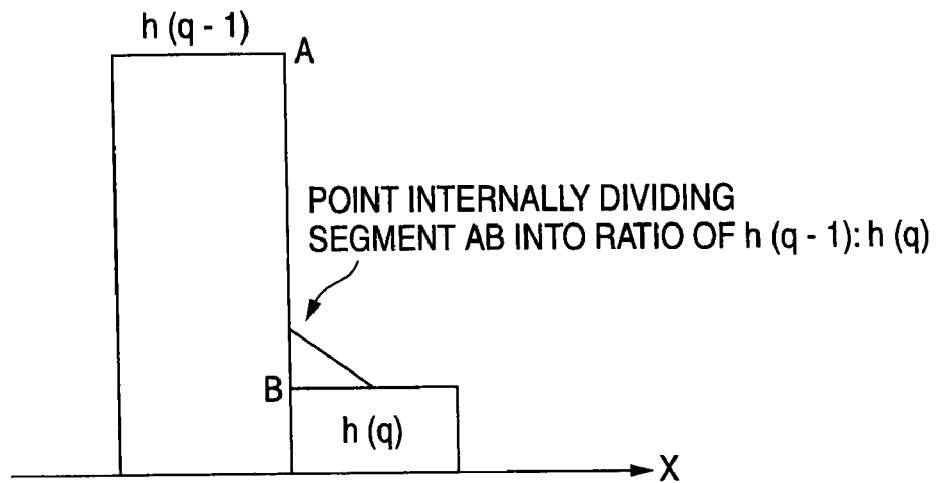
FIG. 8A is a diagram illustrating a polygonal-line approximation in a first modification.

(1) First, the polygonal-line approximating section 520 defines an estimation value Fq(M1($q$)) at the boundary M1($q$) of the quantization range as a point internally dividing an interval between h(q) and h(q−1) (i.e., a segment AB) into a ratio of h(q):h(q−1), as shown in FIG. 8A.

Specifically, the polygonal-line approximating section 520 calculates the estimation value Fq(M1($q$)) according to the following calculation.

$$Fq(M1(q)){=}2{\times}h(q){\times}h(q{-}1)/(h(q){+}h(q{-}1))$$

Similarly, the polygonal-line approximating section 520 calculates an estimation value Fq(M2($q$)) at the boundary M2($q$) of the quantization range (i.e., a point internally dividing an interval between h(q) and h(q+1) into a ratio of h(q): h(q+1)) according to the following calculation.

$$Fq(M2(q)){)}2{\times}h(q){\times}h(q{+}1)/(h(q){+}h(q{+}1))$$

By such a calculation, the following relationship can be established.

$$F(q(M1(q)){-}h(q){<}h(q), \text{ when } h(q{-}1){>}h(q), \text{ or}$$

$$F(q(M2(q)){-}h(q){<}h(q), \text{ when } h(q{+}1){>}h(q)$$

Accordingly, since a value of Fq(M(q)) can be set to be small, the shaded portion shown in FIGS. 7A and 7B can be sufficiently corrected.

(2) Next, the polygonal-line approximating section 520 divides the quantization range M1($q$) to M2($q$) into four regions. In other words, a point internally dividing the quantization range M1($q$) to M2($q$) into a ratio of 1:3 (i.e., a point C shown in FIG. 8B) is taken as M3($q$) and a point internally dividing the quantization range M1($q$) to M2($q$) into a ratio of 3:1 (i.e., a point D shown in FIG. 8B) is taken as M4($q$).

$$M3(q){=}M1(q){+}(\tfrac{1}{4}){\times}(M2(q){-}M1(q))$$

$$M4(q){=}M1(q){+}(\tfrac{3}{4}){\times}(M2(q){-}M1(q))$$

Figure 8B:
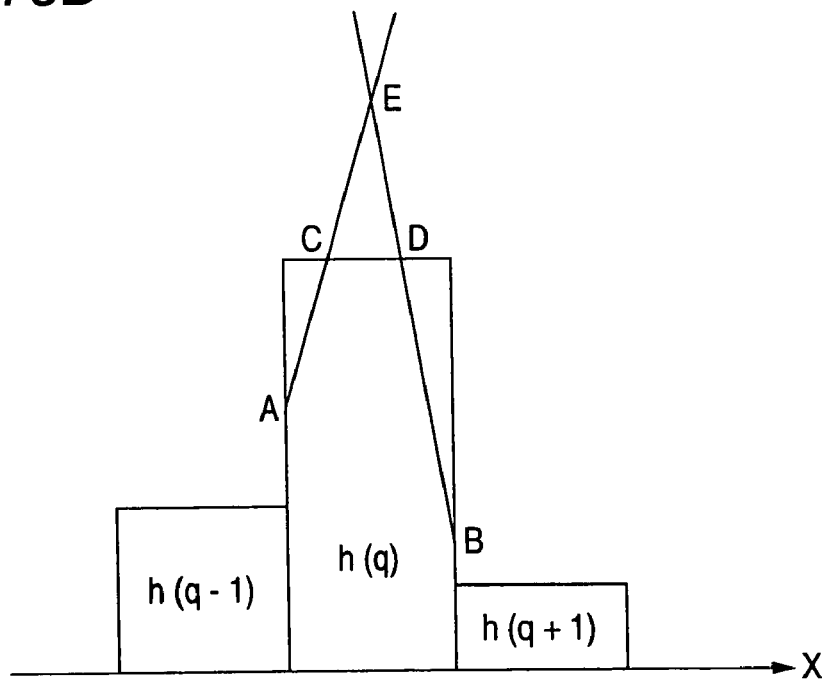
FIG. 8B is a diagram illustrating a polygonal-line approximation in the first modification.

Here, $Fq(M3(q)){=}h(q)$ and $Fq(M4(q)){=}h(q)$ (3) Next, when h(q−1), h(q) and h(q+1) do not increase or decrease monotonously, the polygonal-line approximating section 520 performs a polygonal-line approximation for the histogram values h(q−1), h(q) and h(q+1) using the four points mentioned above. That is, as shown in FIG. 8B, if it is assumed that:

Point A=coordinate ($M1(q)$, $2{\times}h(q){\times}h(q{-}1)/(h(q){+}h(q{-}1))$)

Point B=coordinate ($M2(q)$, $2{\times}h(q){\times}h(q{+}1)/(h(q){+}h(q{+}1))$)

Point C=coordinate ($M3(q)$, $h(q)$)

Point D=coordinate ($M4(q)$, $h(q)$) and

Point E=an intersection of a straight line AC and a straight line BD, the polygonal-line approximation is indicated by a segment AE and a segment BE.

When h(q−1), h(q) and h(q+1) increase or decrease monotonously, it is assumed that a coordinate of point F is (M(q), h(q)), and the polygonal-line approximation is indicated by a segment AF and a segment BF.

That is, when the histogram values h(q−1), h(q) and h(q+1) increase or decrease monotonously, since the straight line AC and the straight line BD do not always have intersections within the quantization range, the polygonal-line approximating section 520 is required to divide the quantization range.

Through the above described polygonal-line approximation, the area of the stepped probability density function can become substantially equal to the area of the probability density function after estimation within the quantization range.

[Second Modification]

The first modification has a big burden to obtain the intersection of the straight line AC and the straight line BD. Further, it is also a burden to determine as to whether the histogram values h(q−1), h(q) and h(q+1) increase or decrease monotonously.

For those reasons, in the second modification, the polygonal-line approximation is performed using a mean value of values of the straight line AC when x=M(q) and a mean value of values of the straight line BD when x=M(q), without obtaining the intersection.

That is,

Point A coordinate ($M1(q)$, $2{\times}h(q){\times}h(q{-}1)/(h(q){+}h(q{-}1))$)

Point B=coordinate ($M2(q)$, $2{\times}h(q){\times}h(q{+}1)/(h(q){+}h(q{+}1))$)

Point G=coordinate ($M(q)$, $h(q){+}\{h(q){-}2{\times}h(q){\times}h(q{-}1)/(h(q){+}h(q{-}1))\}$)

That is, the point G is taken as a coordinate (M(q), $2{\times}h(q)^2/(h(q){+}h(q{-}1))$), a point H is taken as a coordinate (M(q), $2{\times}h(q)^2/(h(q){+}h(q{+}1))$), and a point I is taken as a middle point of a segment GH.

A coordinate of this point I becomes $(M(q), h(q)^2\{1/(h(q)+h(q-1))+1/(h(q)+h(q+1))\})$.

With such definition for these points, the polygonal-line approximating section 520 in this modification performs the polygonal-line approximation using a function corresponding to a segment AI and a segment BI.

Figure 9A:
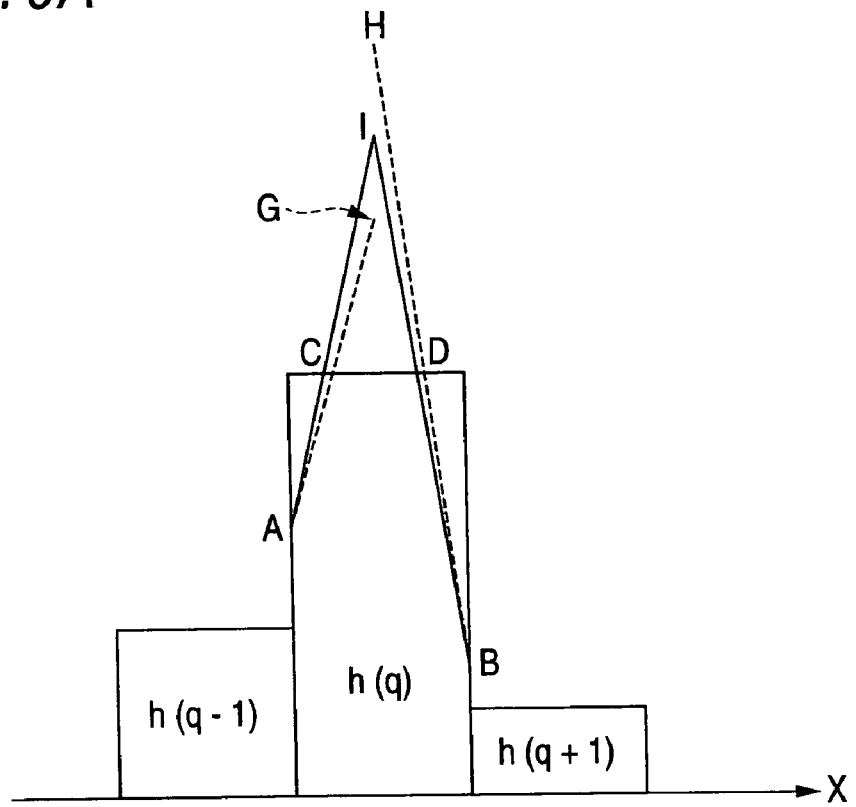
FIG. 9A is a diagram illustrating a polygonal-line approximation in a second modification.
Figure 9B:
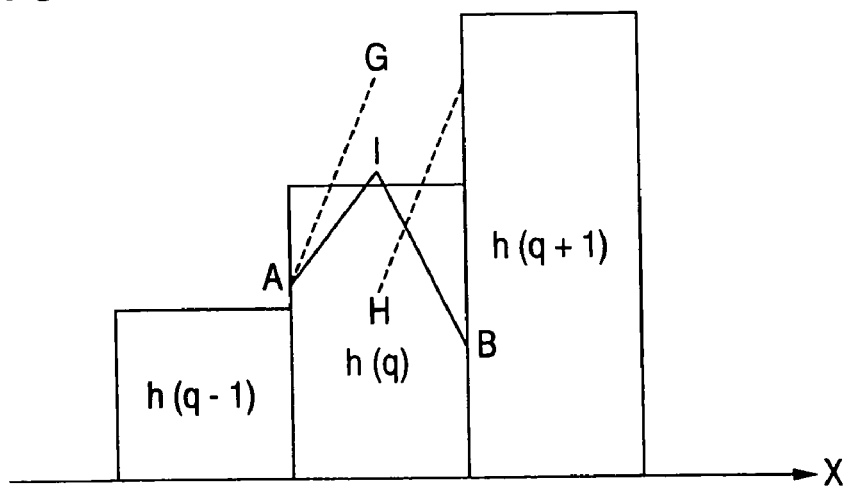
FIG. 9B is a diagram illustrating a polygonal-line approximation in the second modification.

FIG. 9A shows a case where the histograms h(q−1), h(q) and h(q+1) have a mountain shape, and FIG. 9B shows a case where the histograms h(q−1), h(q) and h(q+1) increase monotonously.

In both cases, the polygonal-line approximating section 520 defines each point as follows, and performs the polygonal-line approximation using a function corresponding to a segment AI and a segment BI.

Point $A$=coordinate $(M1(q), 2 \times h(q) \times h(q-1)/(h(q)+h(q-1)))$

Point $B$=coordinate $(M2(q), 2 \times h(q) \times h(q+1)/(h(q)+h(q+1)))$

Point $I$=coordinate $(M(q), h(q)^2\{1/(h(q)+h(q-1))+1/(h(q)+h(q+1))\})$

Moreover, this modification may be divided into several cases.

Specifically, when the histograms h(q−1), h(q) and h(q+1) do not increase or decrease monotonously, the polygonal-line approximating section 520 may introduce the middle point I between the points G and H, as shown in FIG. 9A, and perform the polygonal-line approximation using a function corresponding to the segment AI and the segment BI. In addition, when the histograms h(q−1), h(q) and h(q+1) increase or decrease monotonously, the polygonal-line approximating section 520 may introduce a point F (i.e., a coordinate (M(q), h(q))) and perform the polygonal-line approximation using a function corresponding to a segment AF and a segment BF.

Further, although the probability density function is made to be continuous, by using the middle point I between the point G and H as shown FIGS. 9A and 9B in this modification, the probability density function is not necessarily continuous.

For example, the polygonal-line approximating section 520 may perform the polygonal-line approximation using a function corresponding to a segment AG and a segment BH as shown in FIGS. 9A and 9B. That is, a function fq(x) is defined as follows:

$fq(x)$=segment $AG$ (where, $M1(q) \leq x < M(q)$)

$fq(x)$=segment $BH$ (where, $M(q) \leq x < M2(q)$)

Furthermore, when the histograms h(q−1), h(q) and h(q+1) do not increase or decrease monotonously, the polygonal-line approximating section 520 may perform a discrete polygonal-line approximation using the above function f(q), i.e., $fq(x)$=segment $AG$ (where, $M1(q) \leq x < M(q)$)

$fq(x)$=segment $BH$ (where, $M(q) \leq x < M2(q)$)

In addition, when the histograms h(q−1), h(q) and h(q+1) increase or decrease monotonously, the polygonal-line approximating section 520 may set the point F as a coordinate (M(q), h(q)) and perform the polygonal-line approximation using the function corresponding to the segment AF and the segment BF.

[Third Modification]

While the polygonal-line approximation is performed for the probability density function in the above embodiments, a curved-line approximation is performed for the probability density function in a third modification.

FIG. 10 is a diagram illustrating a decoding program 52 in the third modification. In this figure, the substantially same elements as FIG. 5 are denoted by the same reference numerals.

As shown in FIG. 10, a decoding program 52 of this modification includes a parameter estimating section 560 instead of the polygonal-line approximating section 520 of the decoding program 5 shown in FIG. 5.

The parameter estimating section 560 performs a curved-line approximation for the distribution of transform coefficients T based on the histogram h(q) acquired by the histogram acquiring section 500.

The parameter estimating section 560 of this example estimates the distribution of transform coefficients T as the Laplace distribution based on the histogram hologram of the quantization indexes.

First, the Laplace distribution can be expressed as a following equation.

$$L(x) = \frac{1}{\sqrt{2}\sigma} \exp\left(\frac{-\sqrt{2}|x|}{\sigma}\right) \quad (5)$$

To estimate a shape of the Laplace distribution, the parameter estimating section 560 may estimate a in the Equation (5).

First, the parameter estimating section 560 calculate a probability density function fhc(x) from the histogram h(q) using the following equation (Equation (6))

$$fhc(x) = \frac{hc(q)}{\sum_q hc(q)} \quad (6)$$

In this case, q=0 corresponds to −1<x<1. In addition, q=1, 2, . . . corresponds to $q \leq x < q+1$, and q=−1, −2, . . . corresponds to $q-1 \leq x < q$.

Figure 11:
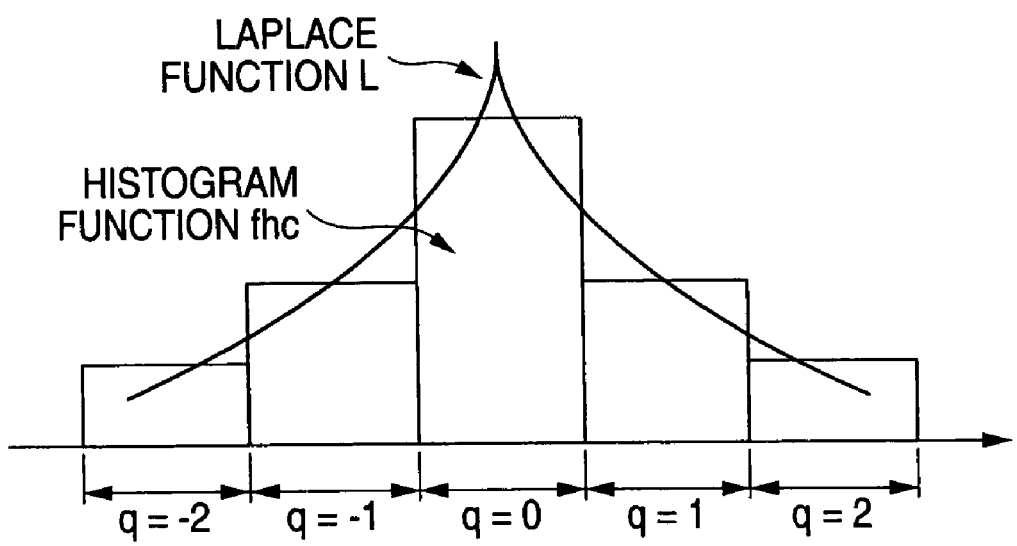
FIG. 11 is a diagram illustrating an approximation using a Laplace distribution (distribution function)

At this time, as shown in FIG. 11, σ making a difference between a Laplace function L(x) and the probability density function fhc(x) as small as possible is obtained.

The following error function Err(σ) is defined as a function to estimate "making the difference as small as possible".

$$Err(\sigma) = \sum_q \left| \int_{(q-0.5) \times D(c)}^{(q+0.5) \times D(c)} \{L(x) - fhc(x)\} dx \right| \quad (7)$$

This error function Err(σ) is a function of summing absolute values of differences of areas of the probability density functions obtained for the quantization index values q. As values of the error function Err(σ) become small, it can be said that fhc(x) approaches L(x). The parameter estimating section 560 obtains σ, which minimizes Err(σ), through a numerical calculation.

Alternatively, the parameter estimating section 560 may prepare a number of values of σ and employ a minimizing Err(σ) among the prepared values of σ.

Alternatively, the parameter estimating section 560 may simply obtain σ by calculating a standard deviation of the quantization indexes Q(c, i, j) for each transform coefficient kind c.

The use of the Laplace distribution has been described by way of examples in this modification, and the invention is not limited thereto. Any functions a shape of which can be determined when parameters are input thereto may be employed. If the number of parameters is N, a numerical calculation to minimize a multi-dimension may be performed.

For example, the parameter estimating section 560 may approximate the histogram using the following general Gaussian distribution GG(x).

$$GG(x) = \frac{\beta}{2\alpha \Gamma\left(\frac{1}{\beta}\right)} \exp\left\{-\left(\frac{|x|}{\alpha}\right)^\beta\right\} \quad (8)$$

Γ( ) in the above equation is a gamma function. A shape of this distribution is determined by parameters α and β. For example, the parameter estimating section 560 may obtain the parameters α and β minimizing the error function Err by applying the error function Err to the gamma function GG(x) (that is, by replacing the Laplace function L(x) in the Equation (7) with the gamma function GG(x)).

Now, the function estimating section 530 will be described.

Here, it is assumed that the probability density function calculated by the parameter estimating section 560 is LL(x).

The function estimating section 530 may obtain the partial probability density function fq( ) assuming Fq(x)=LL(x), according to a following equation.

When q>0, a correspondence is taken as M1→0 and M2→1.

$$fq(x)=Fq(M2(q)-M1(q))x+M1(q).$$

When q<0, a correspondence is taken as M1→1 and M2→0.

$$fq(x)=Fq(M1(q)-M2(q))x+M2(q).$$

[Fourth Modification]

In the third modification, if the parameters are estimated using a pre-assumed parameterized distribution function, a more precise estimated probability density function formed of a curved line can be obtained. However, a problem is that the pre-assumed parameterized distribution function is not always equal to an actual distribution of transform coefficients. For example, although the Laplace distribution or the general Gaussian distribution decreases monotonously for |x|, it cannot be concluded that the actual distribution also decreases monotonously.

For that reason, in the fourth modification, the polygonal-line approximation and the curved-line approximation using the distribution function are simultaneously used. More specifically, a relatively parameterized distribution function approximation is applied for a region having relatively small values of |q| and having a number of signals (that is, having high appearance frequency of quantization indexes). On the other hand, the polygonal-line approximation is applied for a region having relatively large values of |q| because the parameterized distribution function approximation may be not appropriate to be applied to the region having relatively large values of |q| and variation of the probability density is relatively small in the region having relatively large values of |q|.

FIG. 12 is a diagram illustrating a decoding program 54 in the fourth modification. In this figure, the substantially same elements as FIG. 5 or 10 are denoted by the same reference numerals.

As shown in FIG. 12, the decoding program 54 of this modification includes the parameter estimating section 560 in addition to the configuration of the decoding program 5 shown in FIG. 5.

The polygonal-line approximating section 520 prepares a threshold TH1, which is a positive integer. Typically, TH1=1 or TH1=2, and so on.

Here, it is assumed that the probability density function estimated by the parameter estimating section 560 is LL(x).

The polygonal-line approximating section 520 obtains Fq(x) by performing the polygonal-line approximation illustrated in the above embodiment or modifications when |q|>TH1.

Further, the polygonal-line approximating section 520 defines left and right points when |q|=TH1. That is, when |q|>TH1, the polygonal-line approximating section 520 takes a value of the left point Fq(M1(q)) as a substitution value LL(M1(q)) of the function obtained by the parameter estimating section 560 and takes a value of the right point Fq(M2(q)) as a substitution value LL(M2(q)) of the function obtained by the parameter estimating section 560.

As illustrated in the above embodiments or modifications, the polygonal-line approximating section 520 performs the polygonal-line approximation using segments connecting three point (or four points). For other points not illustrated in the above description, the polygonal-line approximating section 520 performs the polygonal-line approximation with taking the same points as the above embodiments or the above modifications.

The function estimating section 530 transforms Fg(x) obtained by the polygonal-line approximating section 520 into the partial distribution density function fq( ) when |q|≧TH1 according to the same method as the above embodiment, and obtains the partial distribution density function fq( ) when |q|<TH1 according to the same method as the third modification.

[Other Modifications]

It has been described that the value r, which is common to the transform coefficient kinds c and the quantization index values q, is obtained in the above embodiments and modifications. Alternatively, different values r may be obtained for different quantization indexes q. For example, if r is a function of q, r can be expressed as r(q).

In this case, the correction-value estimating section 540 can obtain a correction value r(q) for each quantization index value q according to the following equation.

$$r(q) = \frac{\int_0^1 x fq(x) dx}{\int_0^1 fq(x) dx} \quad (9)$$

At this time, the dequantization-value outputting section 550 calculates the dequantization value using the correction value r(q) corresponding to the quantization index value q.

Similarly, different values r may be obtained for different transform coefficient kinds c. For example, if r is a function of c, r can be expressed as r(c).

In this case, the histogram acquiring section 500 calculates the histogram value h(q) for each transform coefficient kind c and regards it as hc(q).

In addition, all h(q) in the above embodiment are replaced by hc(q), and then all processes may be performed for each transform coefficient kind c.

As a result, the partial probability density function fq(x) is also calculated for each transform coefficient kind c. The partial probability density function corresponding to the transform coefficient kind c is assumed as fcq(x).

In this case, the correction-value estimating section 540 obtains r(c) for each transform coefficient kind c.

At this time, the dequantization-value outputting section 550 calculates the dequantization value using the correction value r(c) corresponding to the transform coefficient kind c.

Similarly, different values r may be obtained for different combinations of transform coefficient kinds c and quantization index values q. For example, if the correction value r is a function of the transform coefficient kind c and the quantization index value q, r can be expressed as a function r(c, q).

In this case, the histogram acquiring section 500 may calculate the histogram value h(q) for each transform coefficient kind c and regards it as hc(q). Also, all h(q) are replaced by hc(q), and then all processes may be performed for each transform coefficient kind c.

At this time, the dequantization-value outputting section 550 calculates the dequantization value using r(c, Q(c, i, j)) corresponding to combinations of the quantization index value q and the transform coefficient kind c.

Further, in the above embodiment, frequencies are measured irrespective of the transform coefficient kind c when the histogram is measured, and finally the partial probability density functions are summed to estimate the value r.

However, the decoding program 5 may first obtain a common value r by means of weight-averaging values, using estimated the value r for the transform coefficient kinds c or the quantization index values q.

Here, the number of signals each having the transform coefficient kind c and the quantization index q is assumed as p(c, q), the number of signals each having the quantization index q is assumed as p(q), and the number of signals each having the transform coefficient kind c is p(c).

In this case, the decoding program 5 calculates r, r (q), or r(c) using the following equation.

$$r = \frac{\sum_c \sum_{q \neq 0} \{p(c,q) \times r(c,q)\}}{\sum_c \sum_{q \neq 0} p(c,q)} \quad (10)$$

$$r = \frac{\sum_{q \neq 0}\left[\left\{\sum_c p(c,q)\right\} \times r(q)\right]}{\sum_c \sum_{q \neq 0} p(c,q)}$$

$$r = \frac{\sum_c\left[\left\{\sum_{q \neq 0} p(c,q)\right\} \times r(c)\right]}{\sum_c \sum_{q \neq 0} p(c,q)}$$

$$r(c) = \frac{\sum_{q \neq 0} \{p(c,q) \times r(c,q)\}}{\sum_{q \neq 0} p(c,q)}$$

$$r(q) = \frac{\sum_c \{p(c,q) \times r(c,q)\}}{\sum_c p(c,q)}$$

Moreover, although Fq( ) is first obtained and then is transformed into fq( ) in the above embodiment, the decoding program 5 may first transform values of T(c, i, j)/D(c) into the range of 0 to 1, and then obtain fq( ) directly.

In addition, although the dequantization has been applied to the JPEG2000 in the above embodiment, the described dequantization may be also applied to the JPEG. In this case, a modification may be made as follows.

That is, the histogram acquiring section 500 defines a histogram function with f(x)=h(q) (when $x \geq 0.5$ and q−0.5<x<q+0.5, or $x \leq 0.5$ and q−0.5<x<q+0.5) and f(x)=h(0) (when −0.5<x<0.5), and the polygonal-line approximating section 520 performs the polygonal-line approximation with M(q)=q, M1($q$)=q−0.5 and M2($q$)=q+0.5.

Further, the parameter estimating section 560 transforms the histogram h(q) into the probability density function fhc(x) by corresponding q=0 to −0.5<x<0.5, q=1, 2, . . . to q−0.5<x$\leq$q+0.5, and q=−1, −2, . . . to q−0.5<x$\leq$q+0.5.

Furthermore, in connection with the third modification, a method in which the parameter estimating section 560 obtains (Tby simply calculating a standard deviation of the quantization indexes Q(c, i, j) for each transform coefficient kind c will be described.

The parameter estimating section 560 can obtain the partial probability density function fq(x) according to the following equation.

$$fq(x) = \frac{f(d1(q) + D(x+0.5))}{\int_{d1(q)}^{d2(q)} f(x)dx} \quad (11)$$

Here, a range of x within which the quantization index takes q is $d1(q)$ to $d2(q)$. Also, a value r for the quantization index q is assumed as r(q).

Here, the following equation is assumed.

$$G(q) = \int_{-0.5}^{0.5} x fq(x) dx \quad (12)$$

Then, r(q) can be expressed as the following equation.

$$r(q) = G(q) + 0.5 \quad (13)$$

When f(x) is the Laplace distribution, r(q) becomes an constant independent of q (i.e., dependent on only a ratio of a to D). Accordingly, the function G(q) can be expressed as the following equation.

$$G(q) = \frac{1}{\alpha} + \frac{1}{e^\alpha - 1} - 0.5 \quad (14)$$

In the above Equation 14, $$\alpha = \sqrt{2}\frac{D}{\sigma} \quad (15)$$

$q \neq 0$ and $q = 0$.

Accordingly, the parameter estimating section 560 can calculates the correction value r according to the following equation.

$$r = \frac{1}{\alpha} + \frac{1}{e^\alpha - 1}$$

That is, the parameter estimating section 560 estimates a standard deviation a of transform coefficient kinds from the histogram of the quantization indexes Q. A method disclosed in JP 2004-80741 A may be used as a method for estimating the standard deviation of transform coefficient kinds from the quantization indexes Q.

Further, the parameter estimating section 560 calculates the value r based on the estimated standard deviation (i.e., the standard deviation of the quantization indexes).

Furthermore, the value r may be calculated at the time of encoding. In this case, the value r is calculated according to the Equations (14) and (15) based on an actual standard deviation of transform coefficients, and the calculated value r is embedded into the code data. The decoding program 5 can perform the dequantization based on the value r embedded into the code data.

This modification is preferable since the value r can be simply obtained only by obtaining the standard deviation of transform coefficients.

As described above, according to one embodiment of the invention, a decoding apparatus includes a distribution generating section and a correcting section. The distribution generating section generates a frequency distribution of quantization index values. The correcting section corrects dequantization values corresponding to the quantization index values based on the frequency distribution of quantization index values generated by the distribution generating section.

The decoding apparatus may further include an expected-value calculating section that calculates an expected value of a probability density function of the quantization indexes based on the frequency distribution generated by the distribution generating section. The correcting section may correct the dequantization values based on the expected value calculated by the expected-value calculating section.

Also, the expected-value calculating section may generate the probability density function using a linear function approximate to at least a portion of the frequency distribution generated by the distribution generating section.

Also, the expected-value calculating section may approximate the frequency distribution by a polygonal line so as to be a continuous function at least at boundaries of quantization intervals corresponding to the respective quantization indexes.

Also, the expected-value calculating section generates at least a portion of the probability density function using a linear function connecting frequency values of two adjacent quantization index values.

Also, when the expected-value calculating section determines a probability density function for a given quantization index value, the expected-value calculating section determines the liner function approximate to the frequency distribution in accordance with a frequency value of the given quantization index value, a ration of the given quantization index value to an adjacent quantization index value, and a difference between the frequency value of the given quantization index value and that of the adjacent quantization index value.

Also, when the expected-value calculating section determines a probability density function for a given quantization index value, the expected-value calculating section may determine the linear function approximate to the frequency distribution using the given quantization index value and a median value of a quantization interval corresponding to the given quantization index value.

Also, when the expected-value calculating section determines a probability density function for a given quantization index value, the expected-value calculating section may determine the linear function approximate to the frequency distribution using a value of where h(q) represents a frequency value of the given quantization index value, and h(q−1) and h(q+1) represent respective frequency values of adjacent quantization index values.

Also, the expected-value calculating section may generate a distribution function, whose shape is determined by an existing parameter, the distribution function approximate to the frequency distribution generated by the distribution generating section. The expected-value calculating section may generate the probability density function using the generated distribution function.

Also, the expected-value calculating section may generate the probability density function for a quantization interval in which absolute values of the quantization index values are equal to or less than a predetermined value, using the distribution function. The expected-value calculating section may generate the probability density function for a quantization interval in which the absolute values of the quantization index values exceed the predetermined value, using a function, which approximates by at least a single straight line the frequency distribution generated by the distribution generating section.

Also, the expected-value calculating section continuously may connect the probability density function generated using the distribution function and the probability density function generated using the function approximating the frequency distribution by the straight line, each other.

Also, the expected-value calculating section may generate the distribution function so that a difference between an area of the distribution function and that of the frequency distribution generated by the distribution generating section is equal to or less than a predetermined value.

Also, the expected-value calculating section may calculate a standard deviation of the quantization indexes based on the frequency distribution generated by the distribution generating section. The expected-value calculating section may generate the distribution function based on the calculated standard deviation.

Also, the distribution generating section may calculate a standard deviation σ representing the frequency distribution of the quantization index values. The correcting section may calculate a correction value r using the standard deviation σ calculated by the distribution generating section, a width D of a quantization interval, and two following equations.

$$\alpha = \sqrt{2}\frac{D}{\sigma}; \text{ and}$$

$$r = \frac{1}{\alpha} + \frac{1}{e^{\alpha} - 1}$$

Also, the decoding apparatus may further include an expected-value calculating section that calculates an expected value of a probability density function of quantization indexes for each quantization interval based on the frequency distribution generated by the distribution generating section. The correcting section may calculate an individual correction value for each quantization interval based on the expected value for each quantization interval calculated by the expected-value calculating section. The correcting section may determine correction values to be applied, based on the calculated individual correction values and number of quantization indexes corresponding to the respective quantization intervals.

Also, the quantization indexes may be associated with kinds of transform coefficients generated in a transform coding process. The distribution generating section may generate a frequency distribution of the quantization index values for each transform coefficient kind. The decoding apparatus may further include an expected-value calculating section that calculates an expected value of a probability density function of the quantization indexes for each transform coefficient kind based on the frequency distribution generated by the distribution generating section. The correcting section may calculate an individual correction values for each transform coefficient kind based on the expected value calculated by the expected-value calculating section. The correcting section may determine correction values to be applied, based on the calculated individual correction values and number of quantization indexes corresponding to the quantization intervals.

Also, the decoding apparatus may further include an expected-value calculating section that calculates an expected value of a probability density function of the quantization indexes for each quantization interval based on the frequency distribution generated by the distribution generating section. The correcting section may calculate a correction value for each quantization interval based on the expected value for each quantization interval calculated by the expected-value calculating section. The decoding apparatus may further include a dequantization-value calculating section that calculates dequantization values using correction values having the same quantization interval of quantization indexes to be dequantized among the correction values calculated by the correcting section.

Also, the quantization indexes may be associated with kinds of transform coefficients generated in a transform coding process. The distribution generating section may generate a frequency distribution of the quantization index values for each transform coefficient kind. The decoding apparatus may further include an expected-value calculating section that calculates an expected value of a probability density function of the quantization indexes for each transform coefficient kind based on the frequency distribution generated by the distribution generating section. The correcting section may calculate a correction value for each transform coefficient kind based on the expected value calculated by the expected-value calculating section. The decoding apparatus may further include a dequantization-value calculating section that calculates dequantization values using correction values having the same quantization interval of quantization indexes to be dequantized among the correction values calculated by the correcting section.

According to one embodiment of the invention, a dequantizing method include generating a frequency distribution of quantization index values; and correcting dequantization values corresponding to the quantization index values based on the generated frequency distribution of quantization index values.

According to one embodiment of the invention, a storage medium is readable by a computer. The storage medium stores a program of instructions executable by the computer to perform a dequantization function comprising the steps of generating a frequency distribution of quantization index values; and correcting dequantization values corresponding to the quantization index values based on the generated frequency distribution of quantization index values.

According to the decoding apparatus set forth above, code data can be decoded more efficiently.

What is claimed is:

1. A decoding apparatus for decoding lossy, encoded transform code data, comprising:
   a histogram acquiring section that generates a frequency distribution of quantization index values from the encoded transform code data, the frequency distribution being based on a number of quantization indexes that become the quantization index values;
   a correction value estimating section that calculates a correction value r corresponding to each quantization index based on the frequency distribution of quantization index values generated by the histogram acquiring section;
   an expected-value calculating section that calculates an expected value of a probability density function of the quantization indexes based on the frequency distribution generated by the histogram acquiring section by using a linear function approximate to at least a portion of the frequency distribution generated by the histogram acquiring section; and
   a dequantization value outputting section that outputs corrected dequantization values corresponding to the quantization index values based on the frequency distribution of quantization index values generated by the histogram acquiring section and the correction value r for subsequent use in efficient decoding of the lossy, encoded transform code data,
   wherein the correction value estimating section corrects the dequantization values based on the expected value calculated by the expected-value calculating section, and when the expected-value calculating section determines a probability density function for a given quantization index value, the expected-value calculating section determines the linear function approximate to the frequency distribution using a value of $$\frac{h(q) \times h(q)}{\frac{1}{h(q)+h(q-1)} + \frac{1}{h(q)+h(q+1)}}$$

where h(q) represents a frequency value of the given quantization index value, and h(q−1) and h(q+1) represent respective frequency values of adjacent quantization index values.

2. The decoding apparatus according to claim 1, wherein:
   the histogram acquiring section calculates a standard deviation a representing the frequency distribution of the quantization index values; and
   the correction value estimating section calculates a correction value r using the standard deviation σ calculated by the histogram acquiring section, a width D of a quantization interval, and two following equations:

$$\alpha = \sqrt{2}\frac{D}{\sigma}; \text{ and}$$

$$r = \frac{1}{\alpha} + \frac{1}{e^{\alpha}-1}.$$

3. The decoding apparatus according to claim 1, wherein:
   the quantization indexes are associated with kinds of transform coefficients generated in a transform coding process;
   the histogram acquiring section generates a frequency distribution of the quantization index values for each transform coefficient; and
   the expected-value calculating section calculates an expected value of a probability density function of the quantization indexes for each transform coefficient kind based on the frequency distribution generated by the histogram acquiring section, wherein:

the correction value estimating section calculates an individual correction value for each transform coefficient kind based on the expected value calculated by the expected-value calculating section; and the correction value estimating section determines correction values to be applied, based on the calculated individual correction values and number of quantization indexes corresponding to the quantization intervals.

4. The decoding apparatus according to claim 1, wherein:

the expected-value calculating section calculates an expected value of a probability density function of the quantization indexes for each quantization interval based on the frequency distribution generated by the histogram acquiring section;

the correction value estimating section calculates a correction value for each quantization interval based on the expected value for each quantization interval calculated by the expected-value calculating section; and a dequantization-value calculating section calculates dequantization values using correction values having the same quantization interval of quantization indexes to be dequantized among the correction values calculated by the correction value estimating section.

5. The decoding apparatus according to claim 1, wherein:

the quantization indexes are associated with kinds of transform coefficients generated in a transform coding process;

the histogram acquiring section generates a frequency distribution of the quantization index values for each transform coefficient kind; and the expected-value calculating section calculates an expected value of a probability density function of the quantization indexes for each transform coefficient kind based on the frequency distribution generated by the histogram acquiring section;

the correction value estimating section calculates a correction value for each transform coefficient kind based on the expected value calculated by the expected-value calculating section; and a dequantization-value calculating section calculates dequantization values using correction values having the same quantization interval of quantization indexes to be dequantized among the correction values calculated by the correction value estimating section.

6. A computer-implemented dequantizing method for decoding lossy, encoded transform code data, comprising:

generating, using a processor, a frequency distribution of quantization index values from the encoded transform code data, the frequency distribution being based on a number of quantization indexes that become the quantization index values;

calculating a correction value r corresponding to each quantization index based on the frequency distribution of quantization index values generated;

calculating an expected value of a probability density function of the quantization indexes based on the frequency distribution generated by using a linear function approximate to at least a portion of the frequency distribution generated; and correcting and outputting, using a processor, dequantization values corresponding to the quantization index values based on the generated frequency distribution of quantization index values and the correction value r for subsequent use in efficient decoding of the lossy, encoded transform code data, wherein the dequantization values are corrected based on the expected value calculated, and the linear function approximate to the frequency value uses a value of $$\frac{h(q) \times h(q)}{\frac{1}{h(q)+h(q-1)} + \frac{1}{h(q)+h(q+1)}}$$

where $h(q)$ represents a frequency value of the given quantization index value, and $h(q-1)$ and $h(q+1)$ represent respective frequency values of adjacent quantization index values.

7. A non-transitory storage medium readable by a computer, the storage medium storing a program of instructions executable by the computer to perform a dequantization function for decoding lossy, encoded transform code data, comprising the steps of:

generating, using a processor, a frequency distribution of quantization index values from the encoded transform code data, the frequency distribution being based on a number of quantization indexes that become the quantization index values;

calculating a correction value r corresponding to each quantization index based on the frequency distribution of quantization index values generated;

calculating an expected value of a probability density function of the quantization indexes based on the frequency distribution generated by using a linear function approximate to at least a portion of the frequency distribution generated; and correcting and outputting, using a processor, dequantization values corresponding to the quantization index values based on the generated frequency distribution of quantization index values and the correction value r for subsequent use in efficient decoding of the lossy, encoded transform code data, wherein the dequantization values are corrected based on the expected value calculated, and the linear function approximate to the frequency value uses a value of $$\frac{h(q) \times h(q)}{\frac{1}{h(q)+h(q-1)} + \frac{1}{h(q)+h(q+1)}}$$

where $h(q)$ represents a frequency value of the given quantization index value, and $h(q-1)$ and $h(q+1)$ represent respective frequency values of adjacent quantization index values.

* * * * *